July 11, 1933.  S. E. WOODWORTH  1,917,818
VALVE FOR ROTARY FILTERS
Filed Nov. 23, 1931  2 Sheets-Sheet 1
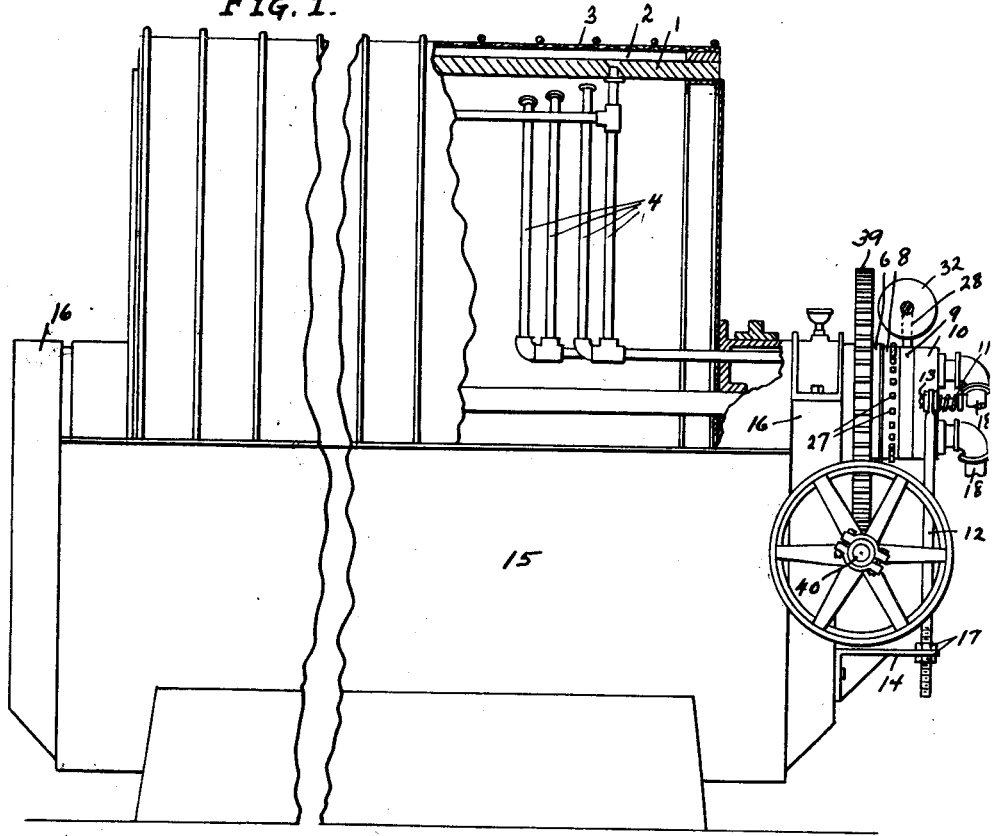
INVENTOR.
SELIM E. WOODWORTH
BY Miller Boyken & Fried
ATTORNEYS.

July 11, 1933.  S. E. WOODWORTH  1,917,818
VALVE FOR ROTARY FILTERS
Filed Nov. 23, 1931  2 Sheets-Sheet 2

INVENTOR.
SELIM E. WOODWORTH
BY Miller Boyken & Bried
ATTORNEYS.

Patented July 11, 1933

1,917,818

UNITED STATES PATENT OFFICE

SELIM E. WOODWORTH, OF SAN FRANCISCO, CALIFORNIA, ASSIGNOR TO HAMILTON, BEAUCHAMP & WOODWORTH, OF SAN FRANCISCO, CALIFORNIA, A COPARTNERSHIP CONSISTING OF E. M. HAMILTON, F. A. BEAUCHAMP, AND S. E. WOODWORTH

VALVE FOR ROTARY FILTERS

Application filed November 23, 1931. Serial No. 576,653.

This invention relates to rotary filters of the type wherein the filter is a rotating cylinder or disk covered with the filtering medium and divided internally into separate compartments to which suction is applied during the period of filter cake formation while the drum or disk is slowly revolved in the liquid to be filtered, followed by washing and/or blowing to dislodge the cake, all as carried out in the Oliver continuous filter, American continuous filter, and others.

In such filters the various sections of the revolving filter are brought in register with various suction and pressure or blow ports on a fixed disk valve portion of the machine during the rotation of the filter drum or disk and it is manifest that before the blowing pressure (whether air or stem) can be applied from within, it will be necessary for one of the revolving section ports to entirely clear the fixed suction port of the valve and also to travel a substantial distance over a dead surface of the valve and then to the blow port so that the suction and pressure ports are not connected by a straddling thereover of the rotating section port, and it is by reason of this that the filter section undergoing this transition is "dead" for such a portion of the revolution as to virtually reduce a large 24 section filter to the actual capacity of a 23 section filter unless this dead period were eliminated.

It is the object of my invention to overcome this dead period in this type of apparatus and increase its effectiveness insofar as useful results of its time period of rotation is concerned, and this is accomplished by a construction of the rotary disk valve which gives an almost instantaneous change from suction to pressure, and vice versa, all in a simple structure which may easily be installed in such filters of the old construction now running.

In the drawings accompanying this application Fig. 1 is a side elevation of an Oliver rotary filter with portions broken away to reveal the interior, and with my improved instantaneous valve in place, but with valve-tripping mechanism off.

Fig. 2 is an enlarged vertical section of the central portion of the valve showing the paths of the flow.

Fig. 3 is an enlarged fragmentary portion of the valve members as seen from the line 3—3 of Fig. 4 to show the switching of the ports by my invention.

Figure 4:
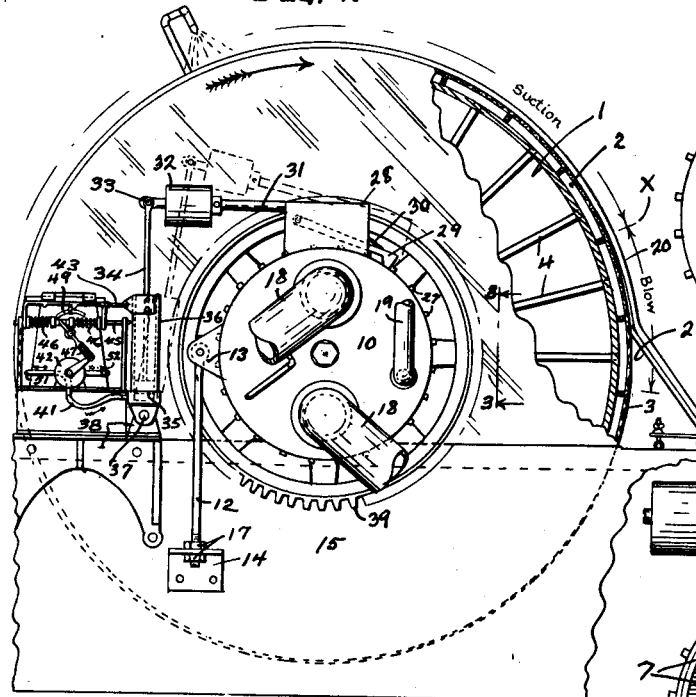
Fig. 4 is an end elevation of the filter with the drum partly in section and indicia showing the degrees of a circle during rotation that suction and pressure are respectively applied.
Figure 6:
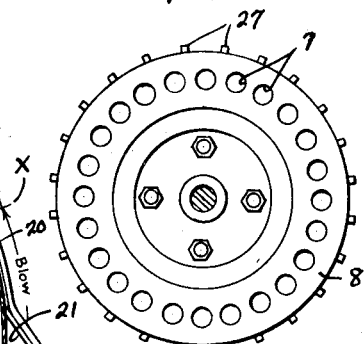
Fig. 6 is a detached view of the rotating ported plate of Fig. 5.

In further detail, 1 is the revolving drum, 2 the sections or peripheral compartments around the drum covered by the usual filtering medium 3 and each compartment separately connected by pipes 4 through ports 5 in the drum hub or trunnion 6 to ports 7 in a disk or so-called valve seat 8 which is secured to and rotates with the drum and against the outer face of which valve seat is positioned my shifting valve disk 9 which in turn has lying against it an outer fixed valve member 10 resiliently pressed toward the valve disk and seat by means of a spring 11 in the known manner of holding the valve members together on this type of filter.

Fixed valve member 10 is anchored against rotation by means of a rod 12 pivoted at its upper end to a lug 13 projecting from member 10 and at its lower end passing through a lug 14 secured to the tank 15 in which the drum revolves while supported in bearings 16, and the effective length of rod 12 is adjustable by means of nuts 17 so as to change the angular relation of certain ports in member 10 to the ports of the rotating valve member.

In the fixed valve member here shown are two suction ports 18 and one blowing port 19, though it should be noted that there may be several distinct blowing ports if desired for air or steam, the filter cake 20 which is formed on the outer side of the filtering medium being released therefrom by a blast of air at a point just above a scraper 21 which diverts the cake to a conveyor not shown.

The suction ports 18 in the fixed member 10 both connect to a common suction channel 22 formed almost completely around the inner surface of the fixed member so as to communicate with the ports 7 of all of the filter sections which are under the liquid in tank 15 as well as those out of the liquid to the point X on Fig. 4 and below which (in direction of rotation of the drum) the blowing is applied to a point extending somewhat below the scraper as further indicated in Fig. 4.

In filters as made before my invention there was a gradual transition period from suction to blow preceding and past the point X which always put one section out of use while its port was passing over a dead spot in the valve before reaching the blowing port, and one of the particular features of the present invention is to get an instantaneous change from suction to blow at this point. This is accomplished by cutting out the valve disk 9 in the form of a circular channel 23 terminating at 24, 25 equal in its included angle all section parts which it is desired be under suction. The walls separating the ends of the circular channel are formed with a slotted port 26 which extends part way through disk 9 only (as shown best in Fig. 3) and which then follows around the disk a short direction between both faces thereof as indicated at 26' in Fig. 3 and emerged at the opposite side of the disk (adjacent valve seat 8) to align with one of its ports 7 as at 26" in Fig. 3.

Figure 7:
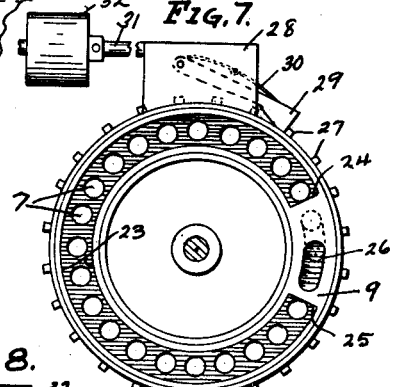
Fig. 7 is a view similar to that of Fig. 5 but with the shifting valve plate at beginning of its movement after picking up a new section port.
Figure 5:
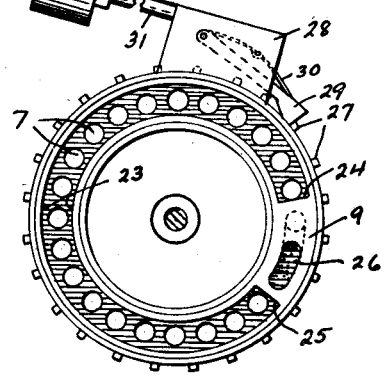
Fig. 5 is a detached end view of the rotating ported plate or "seat" of the filter drum with my special shifting valve plate in front of it and at end of its movement corresponding to Fig. 3, and with part of the operating mechanism on top.
Figure 8:
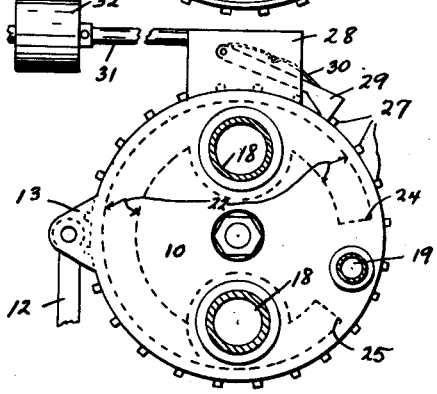
Fig. 8 is a view similar to that of Fig. 7 except that the outer fixed valve member is shown in place.
Figure 9:
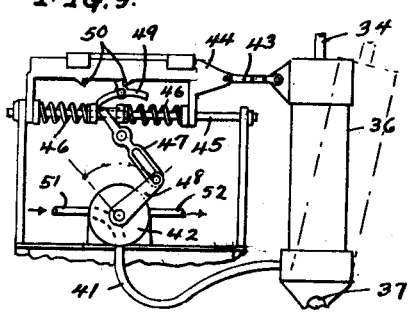
Fig. 9 is an enlarged elevation of the air-operating mechanism for the shifting plate.

During the continuous slow rotation of the filter and its multi-ported valve seat 8 disk 9 is at regular intervals given a quick backward rotative movement to the position shown in Fig. 7 to catch the next one of the on-coming ports 7 and align it with port 26" of the disk and after which the disk travels slowly with the drum a distance equal to the angular separation of the drum sections (to the point shown in Fig. 5) and maintains the aligned port under blowing pressure from port 19 which is aligned over slot 26 in the disk during this entire movement.

The intermittent oscillatory motion of the disk may be obtained through various constructions, but I have found a combination of air pressure and suction to work satisfactorily. The mechanism for thus operating the disk includes a row of stop pins 27 spaced around the periphery of the valve disk, between the ports 7, a lug 28 secured to the upper edge of disk 9 and carrying at one side a pivoted gravity latch 29 further urged downward by a light spring 30. The latch is arranged to ride on valve seat 8 and drop between pins 27 upon reverse turning of disk 9 and to present a square nose against a pin upon right-hand turning movement of the disk.

Secured to and projecting in a substantially horizontal direction from lug 28 is a rigid arm 31 carrying a light weight 32 which may be adjusted along the arm, and the extreme end of the arm is pivoted at 33 to a piston rod 34 carrying a piston 35 at its lower end working in an air cylinder 36 in turn pivoted at 37 to a rigid supporting bracket 38 fastened to the side of the tank.

The arrangement of the air cylinder and piston is such that when air is forced under the piston it will push the arm 31 in a circular direction to revolve the valve disk 9 and hold the nose of latch 29 against one of the pins 27 while the drum is being revolved by power through its worm gear 39 from worm shaft 40, and when the piston is retracted it will turn the disk back the angular distance equal to one filter section.

To thus automatically operate the valve disk I admit alternate air pressure and suction to the under side of the piston through a flexible hose 41 by way of automatically tripped three-way valve 42 from suitable sources of pressure and suction respectively through pipes 51, 52. This valve is tripped at opposite ends of the piston stroke by means of a link connection 43 to the cylinder 36 which slides a yoke 44 back and forth on a fixed rod 45 to alternately compress springs 46 for throwing a lever 47 connected to the valve arm 48, while a trigger 49 holds each spring during compression until released by a lug 50 on the yoke all in a manner well known in reversing trips, the trip mechanism being merely illustrative of innumerable arrangements for accomplishing this. The setting of the trip is such as to give such motion to the piston as will turn the valve disk 9 from position shown in Fig. 7 to position shown in Fig. 5, corresponding to one section of the filter drum so as to maintain the blowing period fully open during that period of travel, and upon reaching position shown in Fig. 5 valve 42 will again be tripped to return disk 9 to the left to pick up with its latch 29 the next pin 27 and at once advance it with the drum as described.

I have used a gravity weight alone to turn disk 9 backward and pulled it forward by rotation of the drum, but the air-operated piston exhausting by vacuum and assisted by gravity weight 32 has been found reliable in operation almost instantaneous, yet without shock.

In considering the invention as described it will be manifest that while I show the full blow period as occupying a time period equal to the travel of one section to the point of the next the disk 9 could be arranged to travel any degree of a circle so as to maintain the blow port open any desired time interval, also that there may be more than one slotted valve port 26 on the disk so as to additionally handle a steam or other port in the same manner as described, if desired.

Having thus described my improved rotary filter automatic change valve, what I claim is:—

1. In a continuous type filter carrying separate compartments through a liquid to be filtered, means for applying suction to the compartments for forming a filter cake upon the filter during a portion of their travel, means for applying a fluid pressure from within the compartments outward against the filter cake at another portion of the travel, and means for making a relatively rapid shift from suction to pressure of the compartments at the transition point in the travel of said compartments said means being operative for making said shift at a rate of speed independent of the rate of travel of the compartment.

2. In a continuous type filter carrying separate compartments through a liquid to be filtered, means for applying suction to the compartments for forming a filter cake upon the filter during a portion of their travel, means for applying a fluid pressure from within the compartments outward against the filter cake at another portion of the travel, and means for making a relatively rapid shift from full suction to full pressure of the compartments at the transition point in the travel of said compartments said means being operative for making said shift at a rate of speed independent of the rate of travel of the compartment.

3. In a continuous type filter carrying separate compartments through a liquid to be filtered, means for applying suction to the compartments for forming a filter cake upon the filter during a portion of their travel, means for applying a fluid pressure from within the compartments outward against the filter cake at another portion of the travel, means for making a relatively rapid shift from full suction to full pressure of the compartments at the transition point in the travel of said compartments, and maintaining said full pressure during the entire pressure period of travel said means being operative for making said shift at a rate of speed independent of the rate of travel of the compartment.

4. In a rotary continuous type of filter divided into separate filtering compartments, means including a row of ports carried by the filter for applying suction to the filtering compartments during a portion of their travel, and a valve operatively associated with said ports arranged for switching said ports successively to a source of fluid pressure for transmission to said compartments respectively during another portion of their travel, means automatically operating said valve for rapidly shifting from suction to pressure and suction and pressure lines communicating with said valve.

5. In a rotary continuous type of filter divided into separate filtering compartments, means including a row of ports carried by the filter for applying suction to the filtering compartments during a portion of their travel, and a valve operatively associated with said ports arranged for switching said ports successively to a source of fluid pressure for transmission to said compartments respectively during another portion of their travel, air-operated means automatically operating said valve for rapidly shifting from suction to pressure and suction and pressure lines communicating with said valve.

6. In a rotary continuous type of filter divided into separate filtering compartments, means including a circular row of ports carried by the filter for applying suction to the filtering compartments during a portion of their travel, a suction line communicating with said ports, a disk valve in said suction line positioned adjacent said ports provided with a passage arranged for diverting one of said ports from said suction, and means arranged and adapted for automatically shifting said disk valve to pick up and divert succeeding ports of said row during the rotation of said filter.

7. In a rotary continuous type of filter divided into separate filtering compartments, means including a circular row of ports carried by the filtered for applying suction to the filtering compartments during a portion of their travel, a suction line communicating with said ports, a disk valve in said suction line positioned adjacent said ports provided with a passage arranged for diverting one of said ports from said suction, and means arranged and adapted for automatically oscillating said disk valve to pick up and divert succeeding ports of said row during the rotation of said filter.

8. In a rotary continuous type of filter divided into separate filtering compartments, means including a circular row of ports carried by the filter for applying suction to the filtering compartments during a portion of their travel, a suction line communicating with said ports, a disk valve in said suction line positioned adjacent said ports provided with a passage arranged for diverting one of said ports from said suction, and means arranged and adapted for automatically oscillating said disk valve to pick up and divert succeeding ports of said row during the rotation of said filter and maintain the port diverted during the return movement of the disk.

9. In a rotary continuous type of filter divided into separate filtering compartments, means including a circular row of ports carried by the filter for applying suction to the filtering compartments during a portion of their travel, a suction line communicating with said ports, a disk valve in said suction line positioned adjacent said ports provided with a passage arranged for diverting one of said ports from said suction, and means arranged and adapted for automatically oscillating said disk valve to pick up and divert succeeding ports of said row during the rotation of said filter comprising an air cylinder provided with a piston operatively connected to said disk for oscillating the same upon movement of the piston, and means for supplying compressed air to said piston.

10. In a rotary continuous type of filter divided into separate filtering compartments, means including a circular row of ports carried by the filter for applying suction to the filtering compartments during a portion of their travel, a suction line communicating with said ports, a disk valve in said suction line positioned adjacent said ports provided with a passage arranged for diverting one of said ports from said suction, and means arranged and adapted for automatically oscillating said disk valve to pick up and divert succeeding ports of said row during the rotation of said filter comprising an air cylinder provided with a piston operatively connected to said disk for oscillating the same upon movement of the piston, and means for supplying compressed air followed by a suction to said piston.

11. In a rotary continuous type of filter divided into separate filtering compartments, means including a circular row of ports carried by the filter for applying suction to the filtering compartments during a portion of their travel, a suction line communicating with said ports, a disk valve in said suction line positioned adjacent said ports provided with a passage arranged for diverting one of said ports from suction to a source of fluid pressure, a pressure line communicating with said valve means for oscillating said disk during the rotation of the filter to successively pick up and divert the ports of said row, said last-mentioned means arranged to give a quick movement of the disk to pick up an oncoming port, and a forward motion with the filter to hold said passage coincident with said port.

12. In a rotary continuous type of filter divided into separate filtering compartments, means including a circular row of ports carried by the filter for applying suction to the filtering compartments during a portion of their travel, a suction line communicating with said ports a disk valve in said suction line positioned adjacent said ports provided with a passage arranged for diverting one of said ports from suction to a source of fluid pressure, a pressure line communicating with said valve means for oscillating said disk during the rotation of the filter to successively pick up and divert the ports of said row, said last-mentioned means arranged to give a quick movement of the disk to pick up an oncoming port, a forward motion with the filter to hold said passage coincident with said port, and a substantially instantaneous reversal at opposite end of the oscillatory movement.

SELIM E. WOODWORTH.